Figure 1:
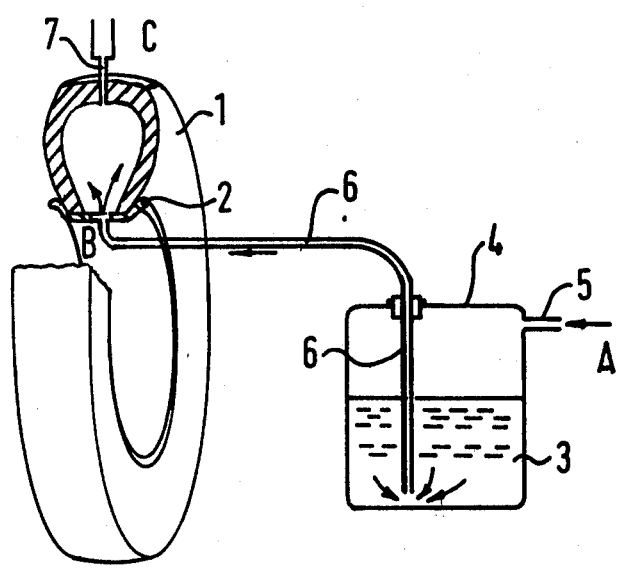

United States Patent [19]

Ford

[11] 4,094,353

[45] June 13, 1978

[54] TIRES HAVING A SOLID POLYURETHANE CORE

[75] Inventor: Peter Ford, Birmingham, England

[73] Assignee: Dunlop Limited, London, England

[21] Appl. No.: 662,020

[22] Filed: Feb. 27, 1976

[30] Foreign Application Priority Data

Mar. 6, 1975 United Kingdom .................. 9254/75

[51] Int. Cl.² ...................... B60C 1/00; C08G 18/14; C08G 18/48; C08G 18/76
[52] U.S. Cl. .............................. 152/310; 260/77.5 AP; 260/77.5 AT; 264/328
[58] Field of Search ............................... 152/310, 314; 260/77.5 AT, 77.5 AP; 264/328

[56] References Cited

U.S. PATENT DOCUMENTS

| | | | |
|---|---|---|---|
| 3,336,242 | 8/1967 | Hampson et al. | 260/77.5 AP |
| 3,356,650 | 12/1967 | McElroy | 260/77.5 AP |
| 3,380,967 | 4/1968 | Lowe et al. | 260/77.5 AP |
| 3,393,243 | 7/1968 | Cuscurida | 260/77.5 AP |
| 3,605,848 | 9/1971 | Lombardi et al. | 152/310 |
| 3,641,093 | 2/1972 | Brooks et al. | 260/77.5 AT |
| 3,644,457 | 2/1972 | König et al. | 260/77.5 AT |
| 3,866,651 | 2/1975 | Gomberg | 152/313 |
| 3,866,652 | 2/1975 | Ahmad | 152/310 |
| 3,907,018 | 9/1975 | Fujikawa et al. | 152/310 |
| 3,907,780 | 9/1975 | Hughes | 260/77.5 AT |
| 3,963,681 | 6/1976 | Kaneko et al. | 260/77.5 AP |

*Primary Examiner*—H.S. Cockeram
*Attorney, Agent, or Firm*—Stevens, Davis, Miller & Mosher

[57] ABSTRACT

A process for puncture-proofing a pneumatic tire mounted on a wheel rim comprises filling the tire with a liquid reactant mixture of (a) at least one liquid polyoxypropylene polyether polyol and (b) a diphenylmethane diisocyanate chemically modified by known means to liquid form, the amounts of these reactants being such that the ratio of functional isocyanate groups to hydroxyl groups in the reactants is in the range 0.65 to 0.9, and cross-linking said mixture to form a resilient solid polyurethane material filling the tire, and a tire and wheel rim assembly so formed.

11 Claims, 2 Drawing Figures

TIRES HAVING A SOLID POLYURETHANE CORE

This invention relates to tires and in particular to the filling of a tire carcass with a resilient material in order to obtain a product which is puncture-proof.

According to the present invention a tire and wheel assembly comprises a tire having a reinforced carcass, and a wheel rim on which the tire is mounted to define a chamber, the chamber having a filling of resilient solid polyurethane material consisting of the reaction product of (a) at least one liquid polyoxypropylene polyether polyol and (b) a diphenylmethane diisocyanate chemically modified by known means to liquid form, the amounts of these reactants being such that the ratio of functional isocyanate groups to hydroxyl groups is in the range of 0.65 to 0.9.

According to the present invention also a process for puncture-proofing a pneumatic tire comprises filling the tire with a liquid reactant mixture of (a) at least one liquid polyoxypropylene polyether polyol and (b) a diphenylmethane diisocyanate chemically modified by known means to liquid form, the amounts of these reactants being such that the ratio of functional isocyanate groups to hydroxyl groups in the reactants is in the range 0.65 to 0.9, and cross-linking said mixture to form a resilient solid polyurethane material filling the tire.

Preferably the liquid polyoxypropylene polyether polyol is a triol. The molecular weight of the polyoxypropylene polyether triol may be selected in order to obtain a solid reaction product having a hardness which produces, in the filled tire, load/deflection characteristics equivalent to a desired inflation pressure. This hardness will generally be in the range 10 to 50 Shore A. If desired a mixture of two or more polyoxypropylene polyether triols of different molecular weights may be used in order to obtain the desired characteristics in the reaction product. It will be noted that it is preferred, even when a mixture is used, to use only tri-functional materials.

The diphenylmethane diisocyanate is preferably a liquid diphenylmethane di-isocyanate (MDI) e g a carbodiimide-modified MDI. These materials have the advantage of having a low vapour pressure at ambient temperatures, being relatively non-toxic in contrast with, for example, toluene diisocyanate which is highly toxic.

The ratio of functional isocyanate groups (—NCO) to hydroxyl groups in the reactants is lower than is generally used in polyurethane formulations and is preferably in the range 0.67 to 0.80.

A catalyst of known type such as stannous octoate may be added to the reactants in order to accelerate cure of the polyurethane and attain a desired speed of reaction. The reactants will generally be mixed before filling of the tire and the so-called "pot-life" of the mixture will depend upon the speed of the reaction between them. A compromise may be obtained between "pot-life" and length of time to cure by suitable adjustment of the amount of catalyst. If desired cure of the solid polyurethane in the filled tire may be further accelerated by elevation of the temperature of the tire.

Filling of the tire is preferably carried out by forcing the liquid mixture of reactants, with catalyst where one is used, into the tire under pressure through a suitable valve in the wheel rim on which the tire is mounted. The tire is preferably held in a vertical position and vented through the tread, e.g. by hypodermic needle, to ensure a complete filling of the tire. Any suitable method of pressurized transfer of the liquid into the tire can be used subject to two provisos (1) care should be taken to avoid bubbles in the liquid mixture and (2) the pressure under which transfer takes place should be readily controllable. A convenient method of transfer is by pressurization with inert gas of a vessel containing the liquid mixture, an outlet pipe from the vessel being connected to the valve on the wheel rim, its end being immersed in the liquid mixture in the vessel. In order to maintain the tire beads in sealing relationship with the wheel rim during tire filling it is preferable to vent the tire in such a way that a controlled back-pressure is maintained in the tire during this operation.

The tire being filled may be a pneumatic tire having the usual fabric reinforced carcass, tread and beads. Alternatively the tire may be one which has been designed to be filled with a resilient solid material rather than air.

The invention is particularly suited to usage in tires which operate under relatively rough conditions e.g. in scrap yards, quarries, farming, military use, refuse dumps, where pneumatic tires are especially puncture prone.

Figure 2:
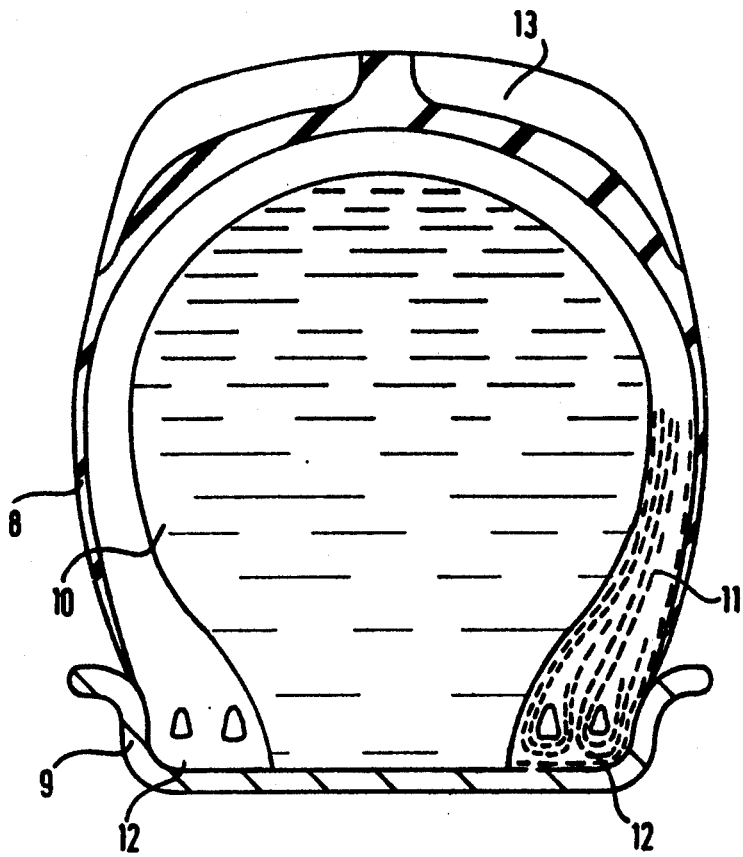

The invention will now be described in more detail with reference to the accompanying drawings in which FIG. 1 illustrates schematically a method for filling a tire with a liquid polyurethane reactant mixture and FIG. 2 is a diagrammatic cross-sectional view of a tire with a solid filling in accordance with this invention.

FIG. 1 illustrates a tire 1 mounted on a wheel rim 2, the tire and wheel assembly being partly sectioned to show the mode of filling of the tire. A liquid polyurethane reactant mixture 3 is held in a container 4 which has an inlet 5 above the liquid level connected to a supply of gas pressure, and an outlet pipe 6 extending from adjacent the bottom of the container to an aperture at B in the wheel rim 2, the aperture containing a control valve (not shown). A hypodermic needle 7 serves as an air vent through the tire tread at the highest point C of the tire.

In the apparatus illustrated in FIG. 1 application of gas pressure at A forces liquid out of the container 4 through the pipe 6 to enter the tire/wheel rim assembly at B. The entrance of the liquid in turn forces air out of the tire through the vent 7 at C. The process is continued until the liquid has replaced all the air in the tires.

In a more sophisticated version of the apparatus (not illustrated) the mixture 3 can be pumped from the container 4 into the tire by means of a pump inserted in the run of pipe 6. In this case, of course, the inlet 5 is not connected to a supply of gas pressure. In order to maintain a back pressure in the tire during filling to keep the beads in position the needle 7 is connected to an airtight valve and pressure gauge, the pressure in the tire being maintained in a desired range by means of the valve. The pressure gauge should be protected by its own valve which can be closed to prevent polyurethane reactant mixture from reaching the gauge.

FIG. 2 illustrates in section a tire 8 mounted on a wheel rim 9 containing a filling of a solid polyurethane composition 10. The tire illustrated is a cross-ply tire having a multiple-ply carcass 11 with twin bead cores in its beads 12, and a heavily lugged tread 13. It will be appreciated that this invention is equally applicable to tires of radial-ply or of bias-belted construction.

The invention is illustrated, by way of example only, in the following examples.

EXAMPLE 1

A tubeless 3.27-8 cross-ply pneumatic tire was assembled on a rim and the valve stem drilled out and replaced. The assembly was mounted vertically with the valve at the top and a size O hypodermic needle was pushed vertically downwards through the tread immediately above the valve so that it protruded about 2 cms into the interior cavity of the tire.

The following polyurethane composition was mixed as described below:

| | | |
|---|---|---|
| Niax LG-56 | (a 3000-M W polyoxypropylene polyether triol from Union Carbide) | 2912.0 g |
| Propylan G-600 | (a 600-M W polyoxypropylene polyether triol from Lankro) | 288.0 g |
| Noucure N-28 | (stannous octoate) | |
| Isonate 143L | (a liquid carbodiimide-modified diphenylmethane diisocyanate from Upjohn). | 492.5 g |

The LG-56, the G-600 and the Nuocure were weighed out into a 5-liter tin and stirred mechanically for several minutes. The Isonate 143L was then weighed into the same tin and stirred for 30 seconds by which time the contents were uniformly opaque; the viscosity was of the order of 510 cps and the ratio of functional —NCO groups to functional —OH groups was 0.785. The 5-liter tin containing the above mix was placed in a pressure vessel with an outlet pipe whose inner end dipped into the liquid mixture and whose outer end was connected to the tire valve via transparent tubing fitted with a clamp. The lid of the pressure vessel was clamped down and 25 psi pressure applied from a nitrogen cylinder. The liquid reactant mixture passed over into the tire and its passage was monitored by observation through the transparent tubing and by noting the egress of air from the hypodermic needle. When polyurethane started to ooze out of this needle, the latter was slowly withdrawn step by step until the needle has been completely removed. The tube leading to the valve was then clamped and cut off, and the tire laid on its side for the filling to set, which took about three hours. The outlet pipe of the pressure vessel and the tubing attached were flushed out with methylene chloride.

After a week the deflection under load, the structural life and the rolling resistance of this tire and of a 2-ply cross-biased tire of the same type inflated pneumatically to 480 kilopascals were measured and are given in the following Table:

| | Polyurethane filled | 480 kpa pneumatic pressure |
|---|---|---|
| Radial stiffness (N/mm) | | |
| at 3 mm deflection | 128 | 136 |
| at 6 mm deflection | 176 | 172 |
| Rolling resistance | | |
| immediately (N) | 10.99 | 6.96 |
| after 15 mins (N) | 7.26 | 5.20 |
| surface temperature (° C) | 31 | 33.5 |
| Fatigue (stepped load) | | |
| distance to fail (km) | 3985 | 4428 |
| surface temperature (° C) | 60 | 123 |

EXAMPLE II

The following materials were weighed out into the containers indicated:

| | kq | |
|---|---|---|
| Niax LG-56 | 25 | into each of two 50-litre drums and stirred |
| Propylan G-600 | .7 | |
| Nuocure N-28 | 0.002 | Referred to as A1 and A2 |
| Isonate 143L | 6.3 | into each of two 25-litre drums Referred to as B1 and B2 |

A 10.0–16 tubeless cross-ply tire fitted on a rim and with the valve replaced by a ½ inch-bore inlet tube with shut-off valve was held vertically in a hoist with the inlet tube at the top. A 0.056 inch-dia hypodermic needle was driven into the tire through the head at the top, and connected via flexible tubing to a bubbler containing a polyol. The inlet tube to the tire was connected by flexible tubing to the output side of a rotary-spur gear pump having a pumping rate of about 750 liters/hour. The input side of the pump was connected to a steel tube whose end was immersed in the liquid in the vessel A1 the tube reaching vertically nearly to the bottom. A stirrer was immersed in the liquid in A1 and driven by an electric motor mounted over the vessel.

The stirrer was switched on and the contents of drum B1 were poured into A1. After 20 seconds stirring (which previous measurements using coloured liquids had shown was adequate to ensure complete mixing), the stirrer and motor were removed, wiped and mounted over vessel A2 in readiness for the next batch. In the meantime, the gear pump was switched on and the polyurethane pumped out of A1 into the tire, its progress being monitored by observation of the bubbler and of the level in the drum. The ratio of —NCO groups to —OH groups in this reactant mixture was 0.729. When the level of the liquid had fallen nearly to the bottom of the pump input pipe (about 6 minutes), the contents of drum B2 were added to drum A2 and stirred for 20 seconds. The steel tube connected to the pump input was removed from vessel A1, wiped and immersed in A2 and switched on. The tire was judged to be filled when the passage of air through the bubbler fell to a very low rate (a further 6 minutes). The shut-off valve at the input to the tire was closed and the tire disconnected from the pump, which was flushed out with solvent. The bubbler was disconnected from the needle which was sealed with a screw plug. The tire was then laid on its side to cure. As judged by the residues of mix in the drums, the pot-life of the mixture of reactants was about 30 minutes, but the tire had been filled in about 12 minutes overall.

After 10 days the tire was tested for load/deflection, heat build-up and fatigue in comparison with a similar tire filled with a commercially available solid polyurethane filling. The load/deflection was the same for both tires. In a heat build-up test (running against a test drum under a scheduled load at 30, 40 and 50 kph):

(a) temperatures in the crown and shoulder region were low in both cases, showing that there was no looseness between carcass and filling (b) temperatures in the middle of the filling were 25° C higher for the example tire (reaching 129° C.) when compared with the commercially available filling.

In a fatigue test (continuously running against a test drum at constant speed and overload) however, the internal temperature of the filling in the example tire levelled off after reaching 130° C and the tire filling had not failed after 160 hours, whereas the temperature of the commercially available filling continued to rise until it failed after 43 hours.

The following Examples relate to the filling of a much larger tire than the foregoing, and illustrate the usefulness of maintaining a back-pressure during filling of such a tire.

EXAMPLE III

Without Back-Pressure

A 14.00 – 24 tubeless earthmover tire mounted on a rim was held vertically with its weight supported by a rope sling and hoist. The pneumatic pressure was released by removing the valve core, and the valve spud was replaced by a fitment including a Saunders on-off valve. A 2-mm hole was drilled vertically downwards at the bottom of the tread pattern at the highest point of the tire almost through to the tread cavity. A 2 -mm I D stainless-steel needle with a 6.35-mm female screw attachment was then inserted via this hole into the tread cavity, to provide a vent hole for displaced air. This vent hole was left open during filling.

A liquid urethane reactant mixture as used in EXAMPLE II was then pumped from a drum via a spur-gear pump through a coupling attached to the Saunders on-off valve and into the tire cavity. As the level of the urethane began to rise within the tire, the material leaked out from between one bead and the rim, causing excessive wastage and mess. It was observed that this bead had become considerably displaced from its correct location. Fortunately the pumping rate was faster than the leakage rate and eventually the urethane reached the vent needle and began to pass slowly through it.

A plug was then screwed into the female fitting on the vent needle and pumping continued. The rise in pressure was then sufficient to force the bead back onto its correct location on the rim. When a pressure equal to the scheduled inflation pressure (350 kPa) was reached, pumping was stopped, the on-off valve at the inlet was closed and the coupling from the pump was disconnected. The tire was then laid on its side for the urethane to solidify.

EXAMPLE IV

With Back-Pressure

The procedure was the same as Example III up to the point where the vent needle was inserted. Then, instead of the vent hole being left open, a fitment for the provision and maintenance of pneumatic back-pressure was screwed into the female fitting (7).

This fitment comprised a T-junction, one arm of which was connected to a first airtight on-off valve. The other arm was connected via a transparent nylon pressure-resistant tube and a second airtight valve to a pressure gauge. Initially both valves were opened and the tire was pneumatically re-inflated through the first valve to relocate the beads on the rims. Care was taken that the pressure as shown on gauge did not exceed the scheduled inflation pressure (350 kPa). The first valve was then shut, the airline removed and the same valve was gently opened until the pressure fell to 50 kPa (which was adequate to maintain bead location), then closed. Urethane was pumped into the tire as in Example III but, since the vent for displaced air was closed, the pressure tended to rise and was kept between 50 and 100 kPa by occasionally opening the first valve. Careful watch was kept on the nylon tubing and, when urethane was seen in this tubing, the second valve was closed to protect the gauge. The first valve was cracked open slightly to flush out any bubbles, then closed to seal the vent. Pressure was allowed to build up as in Example III before the filling valve was closed and the pump uncoupled. This tire also was laid on its side for the urethane to set.

In this Example there was no leakage of material.

Having now described my invention - What I claim is:

1. A tire and wheel rim assembly comprising a tire having a reinforced carcass, a wheel rim on which the tire is mounted to define a chamber, the chamber having a filling of resilient solid polyurethane material consisting of the reaction product of a) at least one liquid polyoxypropylene polyether polyol and b) a diphenylmethane diisocyanate chemically modified by known means to liquid form, the amounts of these reactants being such that the ratio of functional isocyanate groups to hydroxyl groups is in the range 0.65 to 0.9.

2. An assembly according to claim 1 in which the liquid polyoxypropylene polyether polyol is a triol.

3. An assembly according to claim 2 in which the molecular weight of the triol is selected in order to obtain a solid reaction product having a hardness in the range 10 to 50 Shore A.

4. An assembly according to claim 2 in which the liquid polyoxypropylene polyether polyol consists of a mixture of two or more polyoxypropylene polyether triols of different molecular weights.

5. An assembly according to claim 1 in which the diphenylmethane diisocyanate is a liquid carbodiimide-modified diphenylmethane diisocyanate (MDI).

6. An assembly according to claim 1 in which the ratio of functional isocyanate groups to hydroxyl groups in said reactants is in the range 0.67 to 0.80.

7. An assembly according to claim 1 in which the speed of reaction between the liquid polyoxypropylene polyether polyol and the diphenylmethane diisocyanate is adjusted by means of addition of a catalyst for the reaction, to said reactants.

8. An assembly according to claim 7 in which the catalyst is stannous octoate.

9. A process for puncture-proofing a pneumatic tire mounted on a wheel rim comprises filling the tire with a liquid reactant mixture of (a) at least one liquid polyoxypropylene polyether polyol and (b) a diphenylmethane diisocyanate chemically modified by known means to liquid form the amounts of these reactants being such that the ratio of functional isocyanate groups to hydroxyl groups in the reactants is in the range 0.65 to 0.9, and cross-linking said mixture to form a resilient solid polyurethane material filling the tire.

10. A process according to claim 9 in which filling of the tire is carried out by forcing a liquid mixture of the reactants into the tire under pressure the tire being vented in such a position that entrapment of air bubbles in the tire is substantially eliminated.

11. A process according to claim 10 in which the tire is vented in such a manner that a back-pressure is maintained in the tire to keep the tire beads in sealing relationship with the wheel rim.

* * * * *